Patented May 29, 1951

2,555,276

UNITED STATES PATENT OFFICE 2,555,276

PRODUCTION OF AMINO ACIDS FROM PROTEIN

Ellis C. Pattee, Cincinnati, Ohio, assignor to National Distillers Products Corp., a corporation of Virginia No Drawing. Application September 30, 1948, Serial No. 52,116

8 Claims. (Cl. 260—529)

This invention relates to new and useful improvements in the production of amino acids from protein.

In the conventional preparation of amino acids from proteins, the latter are subjected to hydrolyzation with a suitable acid, usually an aqueous solution of a strong inorganic acid such as $H_2SO_4$ or HCl. The resultant hydrolysate contains in solution a mixture of the component amino acids which are present, by reason of their amphoteric nature, in the form of the amino salts of the hydrolyzing acid. After suitably filtering the solution to remove therefrom humin and other impurities, the excess acid is removed, and the amino acids either free or combined recovered by suitable recognized procedures.

When using hydrochloric acid as the hydrolyzing agent, the filtered hydrolysate is subjected to distillation which removes about 50% of the excess HCl. The remainder of the acid, and particularly that portion attached to the amino radical, is only difficult to remove, and many require such cumbersome and expensive procedures as chloride precipitation with silver hydroxide or the like.

If the hydrolyzing acid is sulfuric acid in accordance with the more common practice in large scale operations, the excess free sulfuric acid, as well as the amino combined sulfuric acid, may be simultaneously removed by precipitation with a suitable precipitant, such as calcium or barium hydroxide yielding the free amino acids. Due to the large amounts of voluminous precipitate, however, considerable losses in the yield of amino acids occur by reason of adsorption by, or, occlusion within the sulfate precipitate.

One object of the instant invention comprises a procedure avoiding some of the aforementioned disadvantages and drawbacks inherent in the hitherto used methods.

A further object of the invention comprises a simplified procedure permitting the obtaining of improved yields of the amino acids or their salts.

In accordance with the broad concept of the invention, a protein hydrolysate containing hydrochloric acid is distilled in the presence of sulfuric acid in a ratio of at least one chemical equivalent of hydrochloric acid for each gram atom of nitrogen in the hydrolysate and at least one chemical equivalent of sulfuric acid for each gram atom of nitrogen in the hydrolysate, and preferably not exceeding 1.5 chemical equivalents of sulfuric acid for each gram atom of nitrogen in the hydrolysate, the total inorganic acid usually being present to the extent of about 10 to 25% by weight of the combined weight of water and inorganic acid in said hydrolysate. Distillation is continued until substantially the major portion of the hydrochloric acid is removed from the hydrolysate, after which the free and combined $SO_4$ ion is precipitated in the form of a difficultly soluble to insoluble sulfate. The hydrolysate is then in condition for the obtaining of an amino acid concentrate and/or the recovery or isolation of one or more amino acids or amino acid salts therefrom.

When proceeding in accordance with the invention, the hydrochloric acid is substantially removed up to 90% and higher. This removal by distillation is not only that of the free hydrochloric acid but also of the combined hydrochloric acid.

Within the preferred embodiment of the invention, however, I find it of advantage to use, for the hydrolyzation of the protein material, a mixture of hydrochloric acid and sulfuric acid within the aforementioned critical proportions. When proceeding in this manner, preferably a mixture of aqueous sulfuric and hydrochloric acids in the prescribed ratio is used. The aqueous acids are preferably added in amount sufficient to substantially cover the protein material.

A convenient source of protein matter is so-called "distillers' dry grains," obtained as the residual material in the conventional starch to alcohol fermentation of cereals. It is not, however, my intention to limit the process to the use of such material.

Hydrolyzation may be carried out by boiling at atmospheric pressure for about 8 to 24 hours. If desired, higher temperatures and/or pressures may be used, in which case the time of treatment can be shortened.

After hydrolyzation is completed, the hydrolysate is filtered to remove humin and other impurities therefrom, and the filtrate is distilled, preferably in vacuo.

After distillation, an aqueous slurry of lime is added in amount sufficient to adjust the pH of the liquid to from 5.5 to 7.5 with cooling if necessary. This will remove substantially all of the $SO_4$ ion. Upon removal of the calcium sulfate precipitate, the amino acids may be recovered from the filtrate in the conventional manner either as a mixture or in the form of individual amino acids after conventional separation of the mixture, as, for example, in accordance with the Dakin butylalcohol extraction method.

By way of preferred procedure for the recovery of amino acids, I find it of advantage to treat the hydrolysate with a creamy, aqueous lime slurry to a pH of 6.5-7. After removal of the calcium sulfate precipitate, the filtrate containing the calcium salts of the amino acids, is concentrated to a solids content of about 50 to 80%, and preferably 60 to 70%. To this is then added methyl alcohol, and preferably substantially anhydrous methyl alcohol in an amount sufficient to yield a final solution containing about 65 to 95%, and preferably 90% by weight of methanol with respect to the water methanol mixture. The solids in the resulting precipitate are preponderantly calcium glutamate, whereas the filtrate contains the balance of the amino acids. After filtration, the filter cake containing the calcium glutamate is dissolved in water and then adjusted with sulfuric acid preferably to a pH of 3.2. The resultant precipitate of calcium sulfate is removed by filtration, and the filtrate is concentrated to a solids content of about 15 to 65%, and preferably 30 to 50%. The bulk of the free glutamic acid precipitates out of the concentrated solution and is then recovered by filtration. The filtrate contains other amino acids in aqueous solution.

The following examples are furnished by way of illustration but not of limitation:

Example I

A suitable kettle, preferably adapted to be operated at both atmospheric and above atmospheric pressure, was charged with about 100 pounds of distillers' dried grains containing about 8% moisture. The grain analyzed to about 4.2% nitrogen and a calculated glutamic acid content of 5.1%.

About 392 pounds of a mixed acid composed of about 41 pounds hydrochloric acid (calculated anhydrous), 16.8 pounds sulfuric acid (calculated anhydrous), and 334.2 pounds of water were used. The kettle charge was refluxed for about 2 hours at atmospheric pressure, and the furfural formed during this operation distilled off. Thereafter, actual hydrolyzation was effected by closing the kettle and heating the contents for about 4 hours at a temperature of about 130° C., whereupon the kettle contents were flashed off and filtered for the removal of humins. The filtered acid hydrolysate (about 507 pounds) was then subjected to vacuum distillation at a temperature of about 60° C. for the removal of hydrochloric acid. About 38 pounds of hydrochloric acid (calculated anhydrous) were contained in the distillate and were recoverable therefrom.

The concentrated hydrolysate (about 62.5 pounds) containing residual hydrochloric acid of about 2.1% (calculated anhydrous), was then neutralized to pH 7 with lime slurry with cooling and stirring. The resultant calcium sulfate precipitate was then removed by filtration. The resultant filtrate (about 308 pounds) containing about 4.7 pounds glutamic acid in the form of its calcium salt, was then subjected to vacuum concentration at a temperature of about 60° C. or less, down to about 75.4 pounds, having at that point a solids content of about 45.3 pounds (including the calcium glutamate).

To this concentrate was then added about 279 pounds of absolute methanol, with stirring, resulting to a final methanol concentration of about 90% of the total methanol water present. The calcium glutamate precipitated upon the addition of the methanol was then removed by filtration and the filter cake washed with about 54 pounds of absolute methanol. The methanol filtrate (about 374 pounds) contained about 33.6% solids, including about 0.48 pound of glutamic acid in the form of its calcium salt.

The crude calcium glutamate cake (about 33.7 pounds) contained a total of about 11.7 pounds solids, including 4.2 pounds of glutamic acid present as its calcium salt. This glutamate cake was dissolved in about 70.3 pounds of water and adjusted with sulfuric acid to a pH of 3.2. The precipitated calcium sulfate was removed by filtration and the filtrate (about 107 pounds) constituted a crude glutamic acid solution, containing about 8.3 pounds of solids, including 3.9 pounds of glutamic acid. The crude glutamic acid solution was then subjected to vacuum concentration at a temperature of about 60° C. or less to approximate 50% solids content. The distillate contained appreciable amounts of methanol which may be recovered therefrom. The concentrate was left to crystallize for about 20 hours, whereupon the glutamic acid crystals (about 3.31 pounds dry) were recovered by washing.

Example II

Using the same equipment described in connection with the preceding example, an aqueous solution of hydrochloric acid containing about 19.1 pounds of hydrogen chloride (calculated anhydrous) was added to about 35.8 pounds of the same type distillers' dried grains used in Example I. These grains tested about 1.54 pounds of nitrogen. The mixture was heated and allowed to reflux at atmospheric pressure for about 2½ hours, during which time furfural was formed and which was recovered from the condensed vapors prior to returning the same to the kettle. Thereafter, the kettle was closed and operated for about 5 hours at a temperature of about 135° C. under pressure above atmospheric. At the end of that period, the solution was permitted to cool and was then discharged from the kettle and filtered for the removal of humins. After washing the humins on the filter, an acid hydrolysate filtrate was obtained approximating a total of about 194 pounds and containing about 14.1 pounds of solids. This filtrate was then subjected to distillation at atmospheric pressure until about 168 pounds of condensate had been collected. A material portion of the hydrochloric acid, i. e., about 13.8 pounds distilled over, and are contained in the condensate from which it may be recovered. Upon discontinuing the distillation, 30 pounds of an aqueous solution containing about 8.9 pounds of sulfuric acid was added, and the mix thereafter subjected to distillation under vacuum at a temperature of approximately 60° C. until an additional 28 pounds of condensate containing about 4.2 pounds of hydrogen chloride were collected. The resulting concentrated hydrolysate aggregated a total of about 28 pounds and contained approximately 1.2 pounds of hydrogen chloride. This was then subjected to neutralization with lime sludge and filtration substantially in the manner set forth in the preceding example. The hydrolysate thus obtained is in neutral form, and suitable for storage or further working up as, for instance, for the recovery of glutamic acid as set forth in Example I.

The foregoing description is for the purposes of illustration and not of limitation and it is therefore our intention that the invention be limited only by the appended claims or their equivalent wherein I have endeavored to claim broadly all inherent novelty.

I claim:

1. Improvement in the method of producing amino acids from protein materials which comprises subjecting an aqueous protein hydrolysate containing hydrochloric acid to distillation in the presence of sulfuric acid in a ratio of at least one chemical equivalent of sulfuric acid for each gram atom of nitrogen in said hydrolysate and at least one chemical equivalent of hydrochloric acid for each gram atom of such nitrogen, continuing said distillation until substantially the major portion of the hydrochloric acid is removed from said hydrolysate.

2. Improvement in accordance with claim 1, in which the total inorganic acid is present to the extent of about 10–25% by weight of the combined weight of the water and inorganic acids.

3. Improvement in accordance with claim 2, in which said sulfuric acid is present not exceeding 1.5 chemical equivalents for each gram atom of such nitrogen.

4. Improvement in accordance with claim 3, in which said free and combined $SO_4$ ion is precipitated by the addition of an aqueous slurry of at least one of lime and baryta, being added in amount sufficient to adjust the pH of the hydrolysate to from 5.5–7.5.

5. Improvement in the method of producing amino acids from protein materials which comprises subjecting a protein material to amino acid hydrolyzation with a mixture of hydrochloric acid and sulfuric acid in a ratio of at least one chemical equivalent of sulfuric acid for each gram atom of nitrogen in said hydrolysate and at least one chemical equivalent of hydrochloric acid for each gram atom of such nitrogen, subjecting the hydrolysate to distillation until substantially the major portion of the hydrochloric acid is removed therefrom.

6. Improvement in accordance with claim 5, in which the total inorganic acid is present to the extent of about 10–25% by weight of the combined weight of the water and inorganic acids.

7. Improvement in accordance with claim 6, in which said sulfuric acid is present not exceeding 1.5 chemical equivalents for each gram atom of such nitrogen.

8. Improvement in accordance with claim 7, in which said free and combined $SO_4$ ion is precipitated by the addition of an aqueous slurry of at least one of lime and baryta being added in amount sufficient to adjust the pH of the hydrolysate to from 5.5–7.5.

ELLIS C. PATTEE.

REFERENCES CITED

The following references are of record in the file of this patent:

UNITED STATES PATENTS

| Number | Name | Date |
|---|---|---|
| 1,073,392 | Braun et al. | Sept. 16, 1913 |
| 2,009,868 | Barnett | July 30, 1935 |
| 2,180,637 | Vemmerer | Nov. 21, 1939 |
| 2,405,574 | Gamma | Aug. 13, 1946 |
| 2,433,219 | Hoglan | Dec. 23, 1947 |

OTHER REFERENCES

Foreman: Biochem. J., vol. 8, pp. 463–467 (1914).

Mellor's Modern Inorganic Chemistry, revised Ed., by Parkes et al. (Longmans), p. 500 (1946).